United States Patent

[11] 3,584,832

| [72] | Inventor | George W. Jackson |
| | | Dayton, Ohio |
| [21] | Appl. No. | 835,481 |
| [22] | Filed | June 23, 1969 |
| [45] | Patented | June 15, 1971 |
| [73] | Assignee | General Motors Corporation |
| | | Detroit, Mich. |

[54] TILT CORE VALVE
1 Claim, 7 Drawing Figs.

[52] U.S. Cl. ..................................................... 251/303,
137/627.5
[51] Int. Cl. ...................................................... F16k 1/16
[50] Field of Search ........................................... 137/636,
636-4, 627.5; 251/303, 228, 357

[56] References Cited
UNITED STATES PATENTS

| 2,945,726 | 7/1960 | Stelzer | 303/31 |
| 2,957,705 | 10/1960 | Herbendr | 251/303X |
| 3,106,203 | 10/1963 | Mayo | 137/627.5X |
| 3,306,319 | 2/1967 | Kendt | 251/303X |
| 3,319,928 | 5/1967 | Anderson | 251/303X |
| 3,411,537 | 11/1968 | Gladstone | 137/627.5X |
| 3,455,335 | 7/1969 | Pekarek | 137/627.5 |
| 3,467,137 | 9/1969 | Brown | 251/303X |
| 3,486,735 | 12/1969 | Smith | 251/303 |
| 3,511,475 | 5/1970 | Pfau | 251/357 |

*Primary Examiner*—Clarence R. Gordon
*Attorneys*—W. E. Finken and J. C. Evans

ABSTRACT: In preferred form, a fluid controller having a body that supports a reciprocating shaft for actuating an elongated operating stem of a valve assembly. The valve assembly includes a valving element fixedly secured to the stem which is maintained in biased sealed relationship with a valve seat by spring means when the valve is closed. The reciprocating shaft has means thereon engageable with the stem to angularly tilt the stem to open the valve in response to the angular relationship between the operating shaft and the stem and independently of the distance between lineally spaced points on the stem and the valve seat of the assembly.

PATENTED JUN 15 1971 3,584,832

INVENTOR
George W. Jackson
BY
J. C. Evans
ATTORNEY

TILT CORE VALVE

This invention relates to Schrader-type core valves and more particularly to valves of the type having a movable elongated stem element with a portion thereof located interiorly of the valve and a portion located exteriorly of the valve to be engaged for operating the valve between an open and a closed position.

One low cost valve suitable for use in different kinds of fluid controllers is the type referred to as a tire core or Schrader-type valve assembly.

The valve is characterized by having open and closed positions selected by pushing or pulling an elongated valve stem.

Furthermore, in some cases a Schrader valve includes an exterior core having a bore directed therethrough in which is located a spring element arranged to bias an operating stem in a direction to cause a valving element to be held in spring-biased sealed engagement with a valve seat component of the assembly. The units are characterized by being easily assembled and reliable in operation.

However, manufacturing variations in the axial dimensions of such valve assemblies are hard to control. This in part is due to tolerance differences in the component parts of such valve assemblies and in part due to differences in the manner in which the component parts are assembled.

As a result, when one of these valve assemblies is operated by axially pushing or pulling its valve stem, it is necessary to carefully adjust the position of the operating member with respect to the operating stem to maintain uniform operation of the controller.

One type fluid controller that uses a valve of this type is shown in U.S. Pat. No. 2,967,547, FIG. 5. The valve assembly is shown at 20a and the operating stem is shown at 40. In this case, to overcome manufacturing variations and adjusting screw 39 is threaded into the end of an operating arm 36. Threading movement of the adjusting screw 39 is necessary to assure that a given movement of the valve-actuating arm 36 will produce accurate valve closing or opening movement.

More particularly, the reason for manufacturing variations in valves of this type is that the valve-operating stem, the valving element on the stem and the seat portion of the valve are all located in line with one another and as a result, once the parts are assembled there will be a wide variation in the location of the tip of the operating stem that is located exteriorly of the valve and an adjacent actuating member that moves into and out of engagement with the operating stem.

An object of the present invention is to eliminate the need for calibrating the relationship between a valve-operating member of a fluid controller with respect to an externally located stem portion of a tire core-type valve assembly by arranging the operating member to actuate the stem portion of the valve by tilting it whereby opening movement of the valve assembly is dependent upon angular movement of the operating stem rather than a push-pull movement.

Still another object of the present invention is to provide a low cost, easily assembled fluid controller for regulating fluid flow between an inlet and an outlet by locating a reciprocating operating shaft within the controller and having a valve assembly therein which includes an elongated operating stem angularly tilted by movement of the operating shaft to open the valve assembly and wherein a valving element on the stem is maintained against a portion of an associated seat portion of the valve assembly when the valve assembly is so opened.

Still another object of the present invention is to provide an improved tire core or Schrader-type valve assembly having a housing or core with a bore directed therethrough having an annular seat in surrounding relationship thereto, and wherein the valve assembly is opened and closed by moving an operating system having a portion thereof located within the bore and a portion located exteriorly of the bore by angularly tilting it from a coaxial relationship with the bore where a valving element on the stem is maintained in a sealed closed position with the seat by a spring component of the assembly.

The above and other objects of the present invention are attained in one working fluid controller that includes a housing having a single inlet and first and second outlets therein. The housing includes a control chamber in which is located a reciprocating operating shaft. The control chamber is in communication with the inlet. A separate bore in the housing is provided that intersects each of the outlets and the control chamber.

Within each of the bores is seated a valve assembly having a housing supportingly received by the controller housing. The valve housing includes a bore therethrough with an annular seat therein.

An elongated operating stem of the valve assembly has a portion thereof located within the control chamber and a second portion thereof located within the valve bore. A valving element is fixedly secured a predetermined distance along the length of the operating stem and a spring biases the valving element into a sealed closed position with respect to the valve seat. When in the sealed position the location of the valving element along the length of the stem in part determines the distance that the stem extends into the control chamber.

Additionally, the valving element is held in place on the stem by a lock element that serves to a center an annular, exposed yieldable face or surface on the valving element with respect to the valve seat. The reciprocating operating shaft includes an abutment shoulder thereon that engages the end of the operating stem.

The stem can extend to a greater or lesser degree into the control chamber depending upon the configuration of the valve bore, the housing portion of the valve assembly, the location of the valving element in its fixed relationship along the length of the stem and like variations that occur in the manufacture of valve assemblies of this type.

Opening movement of the valving element with respect to its seat occurs by angularly tilting the operating stem from an aligned coaxial relationship with the bore of the valve assembly. This causes the valving element to angularly tilt a like amount with respect to the valve seat and a portion of the valving element is maintained in spring-biased engagement with the seat to serve as a pivot point for the aforementioned tilting movement.

The opening movement, accordingly, is attained solely by angularly tilting the operating stem of the valve. Thus, valve opening and closing is attained substantially independently of axial dimension variations in the manufacture of a particular valve assembly located within the support bore of the controller housing.

Further objects and advantages of the present invention will be apparent from the following description, reference being had to the accompanying drawings, wherein preferred embodiments of the present invention are clearly shown.

IN THE DRAWINGS

Figure 1:
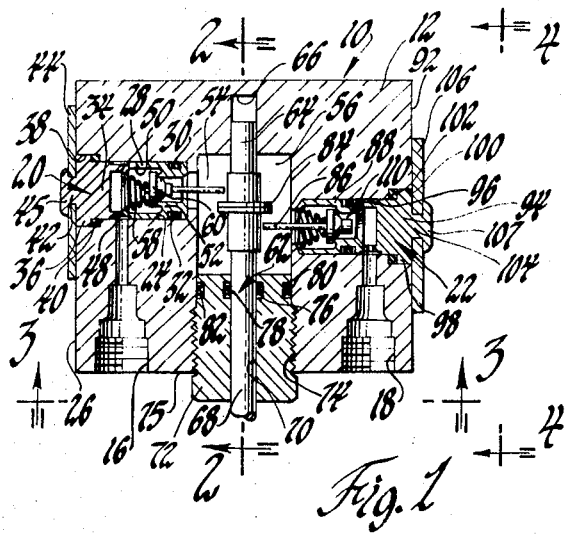
FIG. 1 is a view in vertical section of a fluid controller in accordance with the present invention.
Figure 2:
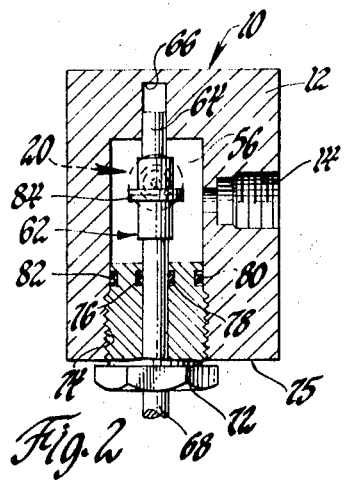
FIG. 2 is a vertical sectional view taken along the line 2-2 of FIG. 1 looking in the direction of the arrows.
Figure 3:
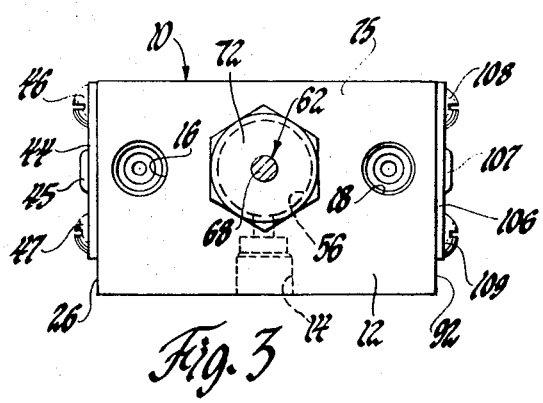
FIG. 3 is a bottom elevational view of the controller in FIG. 1 taken along the line 3-3 looking in the direction of the arrows.
Figure 4:
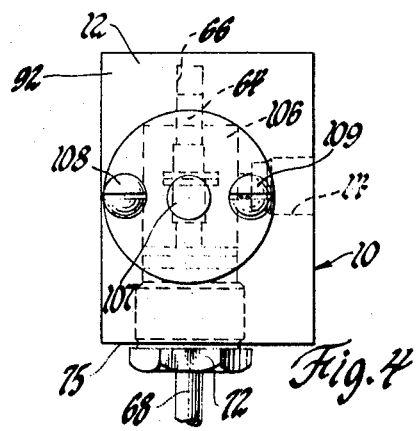
FIG. 4 is a side elevational view of the controller of FIG. 1 taken along the line 4-4 of FIG. 1 looking in the direction of the arrows.

In the drawings a fluid controller 10 is illustrated that has a housing 12 in which is located an inlet 14 and first and second outlets 16, 18.

More specifically, the outlets 16, 18 for purposes of this description, will be referred to as a fill port and an exhaust port, respectively.

A fill control valve assembly 20 is interposed between the inlet 14 and the fill port 16 and an exhaust valve assembly 22 is interposed between inlet 14 and the exhaust port 18.

More particularly, the assembly 20 is located within a bore 24 that extends transversely of a sidewall 26 of the housing 12 as best seen in FIG. 1. More particularly, the valve assembly 20 includes a core 28 supportingly received by the housing 12 within the bore 24. One end of the core 28 has an annular groove 30 therein which receives an O-ring element 32 that seals against leakage around the outer periphery of the core 28.

In the illustrated embodiment the core 28 is held in its supported seated relationship with the housing 12 by a plug element 34 which includes a flanged head 36 seated within a countersunk opening 38 within the wall 26. The head 36 engages an O-ring element 40 within the countersunk opening 38 to seal leakage around the outer periphery of the plug 34 exteriorly of the housing 12.

In the illustrated arrangement the plug includes a stem 42 thereon which extends through a retainer plate 44 located in juxtaposed engagement with the outer surface of wall 26.

The stem 42 is headed over at 45 to fixedly secure the plug element 34 to the plate 44 and a pair of spaced-apart screw elements 46, 47 are directed through the plate 44 into threaded engagement with the housing 12 for holding the valve assembly 20 and retaining plug 34 within the bore 24 and countersunk opening 38, respectively.

The plug element 34 also includes an opening 48 therein which communicates the fill port 16 with a bore 50 which extends through the valve core 28. An annular valve seat 52 is located interiorly of the core 28 concentrically of the bore 50 therethrough. An elongated operating stem 54 of the valve assembly 20 has a portion thereof located interiorly of the bore 50 and an end portion thereon which extends interiorly of a control chamber 56 within housing 12.

A conically shaped compression spring 58 located within the bore 50 has one end thereof seated against the core 28 and the opposite end thereof seated against the face of a valving unit 60 which is fixedly secured to the valve stem 54 at a predetermined point along the length thereof.

The compression spring 58 serves to resiliently bias the valving unit 60 into a closed sealed relationship with the annular valve seat 52 wherein the bore 50 is closed to prevent fluid flow from the inlet 14 thence through the control chamber 56 to the fill port 16.

When the valving assembly 60 is in its closed relationship with respect to the valve seat 52, as seen in FIG. 1, it is arranged coaxially of the bore 50.

Within the operating chamber 56 is located a valve-operating shaft 62 that includes a small diameter end portion 64 thereon slidably guided within an opening 66 of the housing 12. The shaft 66 further includes an elongated plunger portion 68 thereon which is directed through an axial opening 70 in a seal plug 72 that is externally threaded to be threadably received within a tapped opening 74 in the wall 75 of the housing 12 through which the fill and exhaust ports 16, 18 extend.

The outer periphery of the plunger 68 is sealed by an O-ring element 76 seated in an annular groove 78 formed around the opening 70 through the plug 72.

The outer periphery of the plug 72 is sealed by an O-ring 80 that is seated within an annular groove 82 in the innermost end of the plug 72 at the outer periphery thereof.

The plug 72 along with the guide opening 66 serves to accurately locate the operating shaft 62 for opposite reciprocating movement in chamber 56 so as to move a radially outwardly directed shoulder 84 on the operating shaft 62 for opposite reciprocating movement in chamber 56 so as to move a radially outwardly directed shoulder 84 on the operating shaft 62 into and out of engagement with the operating stem 54 of the fill control valve assembly 20 and with respect to a like elongated operating stem 86 that extends from the exhaust valve assembly 22 interiorly of the control chamber 56 as is best seen in FIG. 1.

The exhaust valve assembly 22 includes a core element 88 that seats in a bore 90 formed in the housing 12 transversely to a sidewall 92 thereof. The core 88 is held in place by a plug 94 having a small diameter portion 96 thereon received within the bore 90 and a flanged head portion 98 thereon seated within a countersunk hole 100 in the sidewall 92.

The flanged head 94 engages an O-ring element 102 in the hole 100 to seal the outer periphery of the plug 94. The plug 94 includes an extension 104 thereon directed through a retainer plate 106 that overlies the wall 92 so as to close the countersunk hole 100 and bore 90. The extension 104 has its head upset at 107 to interlocking engagement with the plate 106 whereby the plate 106 serves as a means for removing the plug from its retained relationship within the housing 12.

A pair of spaced-apart screws 108, 109 extend through the plate 106 into threaded engagement with the housing 12 for fixedly securing the core 88 and plug 94 within the housing 12.

In accordance with certain principles of the present invention the operating stem 86 is part of a valve stem assembly 110 that constitutes a preassembled combination of elements that fits within the core 88.

Figure 6:
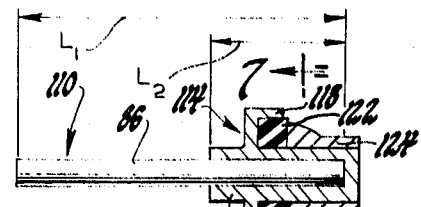
FIG. 6 is an enlarged sectional view of a valve stem assembly of the exhaust valve assembly of FIG. 5; and, FIG. 7 is a vertical sectional view taken along the line 7-7 of FIG. 6 looking in the direction of the arrows.

More particularly, the valve stem assembly 110, as is best seen in FIG. 6, includes a valve element holder 114 with an open-ended hollow central portion 116 that fits over the end of the operating stem 86 that is located within the core 88.

The holder 114 further includes an annular flanged portion 118 extending radially outwardly of the central portion 116 to define a continuously formed recessed opening 120 around the outer surface of the central portion 116 in which is seated an annular resilient seal element 122.

In the illustrated arrangement the seal element 122 is held in place by a tubular lock element 124 that is press fit and crimped securely on the end of the central portion 116 which extends interiorly of the core 88 from the valving element 122.

The outer surface 126 of the lock element 124 is of a general conoidal shape and thereby serves as a means for centering the resilient valving element 122 generally concentrically within the interior of the core 88 by engaging the inner surface of a bore 128 through the core 88.

Figure 7:
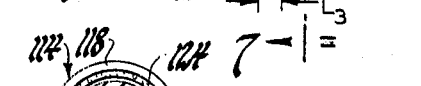

More particularly, the lock element 124 and the resilient valving element 122 are concentrically arranged with one another as best seen in FIG. 7 to define an annular exposed surface 130 on the element holder 114 which is maintained in sealed closed relationship with a narrow, annular valve seat 131 at the end of the bore 128 when the valve assembly 22 is closed.

A conically shaped compression spring 132 located within the hollow core element 88 has one end thereof in engagement with an inwardly crimped nose portion 134 on the core 88 and the opposite end thereof in engagement with the flange portion 118 of the valve element 114 so that the exposed surface 130 of the resilient valving element 122 will be spring-biased into its sealed closed relationship 130 during this phase of operation.

The hollow core element 88 and its opened ends serve to communicate the inlet 14 into the control chamber 56 with the exhaust port 18 through an opening 136 formed in the small diameter end 96 of the plug 94 when the valving element is moved into an open position with respect to the seat 130. When the valving element 122 is spring biased into its closed sealed position with the seat 130 communication between the inlet 14 and the exhaust port 18 is blocked.

In accordance with certain principles of the present invention, the preassembled valve stem assembly 110 is characterized by the fact that the stem 86, the valve element holder 114 the resilient valving element 122 and the lock element 124 are arranged so that certain axially linear dimensions thereon will establish the location of the end 138 of the stem 86 within the control chamber 56.

Figure 5:
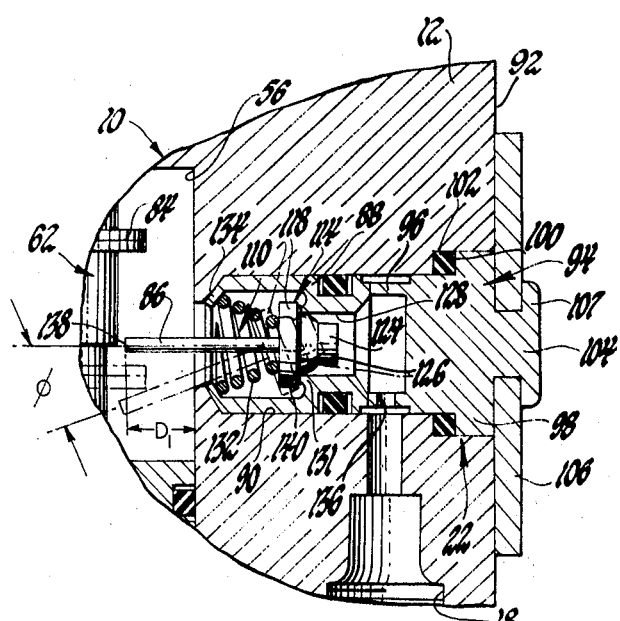
FIG. 5 is an enlarged fragmentary sectional view of an exhaust valve assembly of the controller in FIG. 1.

More particularly, as seen in FIG. 5 the stem will have a length $L_1$ that will vary depending upon manufacturing tolerances of making the stem. The central portion 116 has a central opening with a length $L_2$ which again varies in accordance with manufacturing variations. The recess 120 has a depth dimension $L_3$ likewise subject to manufacturing variations and the valving element 122 thereof will have a thickness represented by dimension $L_4$ again varying in accordance with manufacturing variations. When the components are assembled as shown in FIG. 6 there is a further manufacturing variation.

Likewise, there is a difference in the dimensions of the core 88 and the location of the seat 131 therein which will vary from item to item. Furthermore, the depth of the bore 90 and the location of the seat 130 with respect to the control chamber 56 can also vary to a greater or lesser degree.

Thus, when the valve stem assembly 110 is located within the hollow core 88 it has been found in practice that valve stem assemblies with a length of ¾ of an inch from one end of the assembly to the opposite end thereof as seen in FIG. 6 can result in a variation of the distance $D_1$ of extension of the end 136 into the chamber 56 that can vary as much as ⅛ of an inch.

In cases where the valving element is opened and closed by a push-pull operation it becomes readily apparent that great care must be used to calibrate the relationship between an operating member for the stem and the point on the stem at which it picks the stem up to produce the pull or push movement for valve operation.

All remarks made regarding the manufacturing and physical characteristics of the valve stem assembly 110 of the exhaust valve assembly 22 apply equally well to the like arrangement found in the fill valve assembly 20. For purposes of this description, however, the improved combination and its mode of operation are made solely with reference to the valve assembly 22 the parts of which are detailedly set forth in FIGS. 5 through 7.

Thus, accordance with certain principles of the present invention the valve is operated to open and close solely in response to angular movement of the stem 86 thereby to eliminate the aforementioned manufacturing variations that can result in a considerable difference in the location of the finally assembled valve stem assembly 110 within the valve assembly 22.

The angular or tilting movement of the valve stem assembly 110 occurs when the operating stem shoulder 84 moves downwardly within the control chamber 56 from the solid line position shown in FIG. 5 to the dotted line position therein. At this point the stem 86 assumes the dotted line tilted position through an angle from the position where the spring 132 and the centering action of the lock element 124 arrange the stem 86 more or less coaxially of the bore 128.

The tilting movement of the operating stem 86 causes a like angular tilting movement of the valve element holder 114 whereby the annular exposed surface 130 on the resilient valving element 122 has a portion thereof tipped away from the valve seat 131 as seen in FIG. 5 and a second part of the exposed surface 130 coacts with a second portion of the valve seat 131 to define a pivot point or fulcrum 140 about which the tilting movement occurs.

It is important to note that push or pull movement of stem 86 is not required for valve operation. Rather, the movement of the valving element 122 from its closed position to its open position depends solely upon the angle of tilt produced by engagement of the shoulder 84 with the end 138 of the stem 86 about the fulcrum 140. Because of this arrangement, valve opening and closing movement is no longer dependent upon the location of the end 136 of the operating stem 86 within the control chamber 56 which can vary substantially because of the manufacturing variances mentioned above.

Because the opening and closing movement depends solely upon angular tilting movement of the stem 86 the controller manufacture involves little or no consideration with differences in manufacturing variations between one valve unit and the other. Thus, the insertable valve assembly 22 or the like assembly 20 can be placed within the housing 12 or a like support member and the end of the stem can extend to a greater or lesser degree within the operating chamber and the operating shaft can be assembled in place with the only tolerance consideration being the location of the operating shoulder 84 thereon.

This shoulder 84 is an item that can be closely controlled and as a result the unit can be considered a fairly reliable and closely calibrated system without the need for bending or adjusting the relationship of the operating stem and the operating shaft components of the assembly.

While embodiments of the present invention, as herein disclosed constitute preferred forms, it is to be understood that other forms might be adopted.

I claim:
1. A valve assembly comprising a housing having a bore therethrough, means defining an annular valve seat within said bore, an elongated stem having a first portion thereof located interiorly of said bore and a second portion thereof located exteriorly of said bore, a valve element retainer fixedly secured to said stem at a predetermined point along the length of said stem having a closed end engaging one end of said stem and an open end from which said stem extends, said retainer having an annular flanged portion between said closed end and said open end defining a continuous recessed opening, an annular valve element located within said retainer opening having an exposed surface, a tubular lock element press fitted on said closed end of said valve element retainer and having one end engaging said valve element to hold it in place within said retainer, said lock element end overlying a predetermined portion of the planar extent of said valve element surface for defining an annular exposed surface segment adjacent the outer periphery of said retainer, means for spring biasing said valve element into a closed, sealed relationship with respect to said valve seat, said elongated stem being located substantially coaxially of the longitudinal axis of said bore when said valving element is in its sealed relationship with said seat, an operating member angularly located with respect to the longitudinal axis of said elongated stem, means on said operating member engageable with said stem to angularly tilt said stem with respect to the longitudinal axis of said bore, said valve element and valve seat engaging one another to define a pivot point for tilting movement of said stem as said valve element moves from its closed sealed relationship with respect to said valve seat, said valve element having a portion thereon moved from said seat in accordance with tilted displacement of said elongated stem whereby the valve element opening is substantially independent of manufacturing variations in the axial dimensions of said stem, valve element and seat, said tubular lock element engaging said bore at one point and said stem engaging said bore at another point following full valve opening to prevent displacement of said valve element from said pivot point thereby to assure movement of said valve element into sealed relationship with said seat on valve-closing movement.